(No Model.) 2 Sheets—Sheet 1.
C. P. & J. A. CHISHOLM.
METHOD OF HULLING PEAS.
No. 421,244. Patented Feb. 11, 1890.
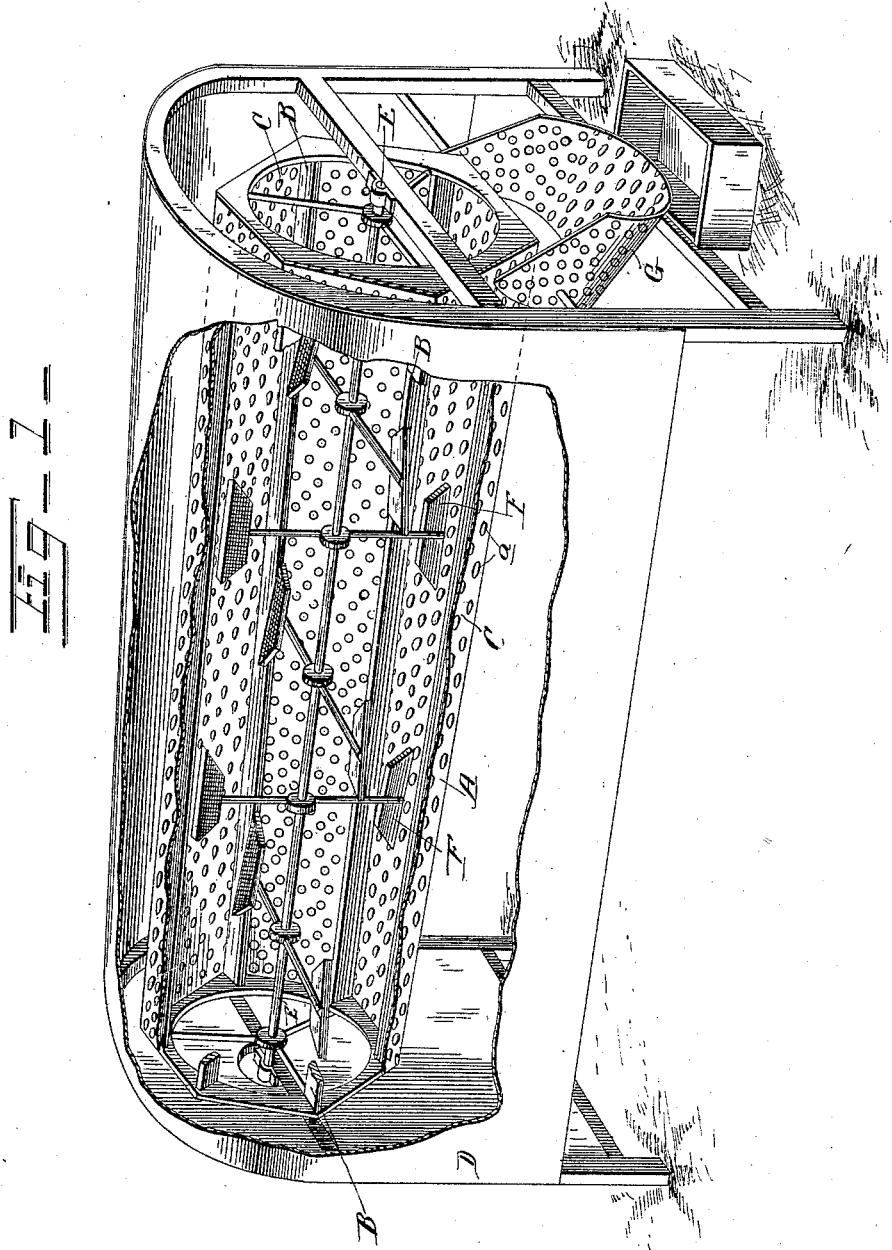
WITNESSES
Wm T. Robertson
Thos. E. Robertson
INVENTORS
Charles Pettit Chisholm
John Alexander Chisholm
By Robert P Scott Attorney

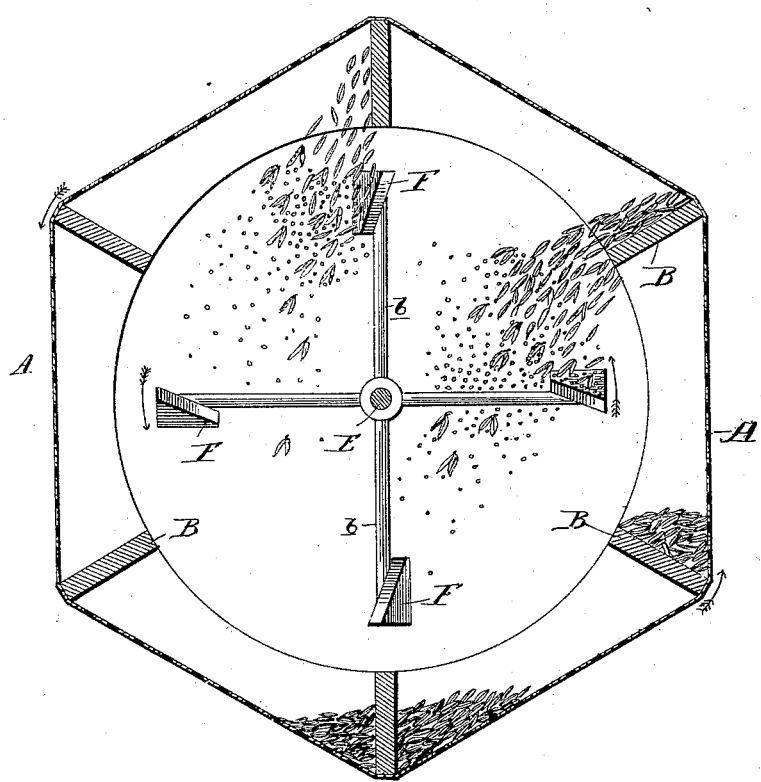

UNITED STATES PATENT OFFICE.

CHARLES P. CHISHOLM AND JOHN A. CHISHOLM, OF OAKVILLE, CANADA.

METHOD OF HULLING PEAS.

SPECIFICATION forming part of Letters Patent No. 421,244, dated February 11, 1890.

Original application filed January 3, 1887, Serial No. 223,170. Divided and this application filed March 2, 1889. Serial No. 301,750. (No model.)

*To all whom it may concern:*

Be it known that we, CHARLES P. CHISHOLM and JOHN A. CHISHOLM, subjects of the Queen of Great Britain, residing at Oakville, in the county of Halton, Dominion of Canada, have invented certain new and useful Improvements in the Method of Hulling Peas, of which the following is a specification, reference being had therein to the accompanying drawings.

The object of this invention is to remove green peas from their pods without injury to the peas; and the invention consists in the novel process of accomplishing the above object, as will be more fully hereinafter described and claimed. The desired result may be accomplished by various apparatuses without departing from the spirit of our invention. We have illustrated the preferable apparatus, but without in any way restricting our claims. An apparatus for accomplishing the same result is shown in our application filed January 3, 1887, Serial No. 223,170, of which this is a division.

We are aware that in addition to the usual mode of shelling peas by hand several processes of accomplishing the same object by machinery have been proposed—as, for instance, passing the pods between elastic rollers, opening the pods by passing them through the intermeshing fingers, and by rubbing the pods between abrading-surfaces, all of which have been found to bruise and injure a large portion of the peas, and are therefore very objectionable in actual use. Now, we have discovered that green peas may be hulled by impact while in free air, and the process of this application is based on this discovery. By "impact" we mean the striking of a solid body against the pods while the latter are so situated that nothing but the resistance of the air holds them against the action of the solid body.

The impact may be given by a variety of apparatuses. For instance, a paddle, beater, or impact opener in the hands of a workman, swung with just the proper velocity, impacting the peas while falling through the air, would execute this process; but we prefer the apparatus in the accompanying drawings, in which—

Figure 1 is a perspective view with parts broken away. Fig. 2 is a cross-section of the same without the outer casing.

In this apparatus the peas are carried to an elevated position in the upper portion of a revolving cylinder, from whence they drop, and while falling through the air they are struck by the beaters, which revolve preferably in the same direction as the cylinder, but at a much greater rate of speed. The cylinder should revolve at just such a speed as not to carry the pods around by centrifugal force, but carry them up and then drop them, and in falling through the air they are struck by the beaters, which may or may not be covered by some soft material (as rubber or leather) to soften the blow. The pods must be struck by a sharp quick blow, which should be just sufficient to crack them open—that is, to sever the connection of the two half-shells of the pod, the connection of the peas with the pods being severed by the same operation. The air naturally confined in the pods protects the peas from being bruised.

In the machine which we have shown, and which by preference we employ to execute our process, the inside diameter of the cylinder is about thirty-six inches, the length of the cylinder is eight feet, and the length of each beater or impact opener, measured from the geometrical axis of the cylinder, is sixteen inches. With a machine of these dimensions the revolutions of the cylinder should be about eighteen per minute, while the beaters should make about one hundred and eighty revolutions in the same time. These dimensions and speeds are given so as to enable a workman to carry out this process without further experiment. They are in no way to be taken as limiting us to any specific dimensions or to the precise speed. Should, however, the speed be increased to five hundred to six hundred revolutions per minute, the principle of operation would be changed and the peas could not be successfully hulled.

As devices for revolving cylinders and other mechanism at different rates of speed in the same direction are well known and understood, we have not shown any means in the drawings.

In order that the peas may not remain in the cylinder—that is, accumulate to such an extent as to impede the progress or become injured by the beaters—we provide the covering of the cylinder with perforations somewhat larger than the peas, so that the peas will immediately escape through said perforations as they are removed from their pods.

Referring to the drawings by letter, A designates a cylinder, B the longitudinal bars, and C the covering, preferably of leather, provided with perforations $a$, of sufficient size to permit of the passage therethrough of the largest pea. A shaft E is journaled in suitable bearings, as shown, and this shaft is provided at intervals with arms $b$, at the outer ends of which are secured the beaters or impact openers F. These impact openers are inclined, as shown, so as to give the peas a glancing blow, which we find tends to lessen the liability of injury to the peas, and at the same time assists the travel of the material to the discharge end of the cylinder, which may be slightly inclined, as shown.

We generally provide a perforated apron G at the discharge end of the cylinder for the purpose of sifting the peas which may be carried out of the cylinder with the pods and straw.

What we claim as new is—

1. The improvement in the art of hulling green peas, which consists in removing the same from the pods by impact, substantially as described.

2. The improvement in the art of hulling green peas, which consists in carrying the filled pods to an elevated position and impacting the filled pods while falling, so as to sever the connections of the two half-shells of the pod and of the peas with the pods at one operation, substantially as described.

In testimony whereof we affix our signatures, in presence of two witnesses, this 6th day of February, 1889.

CHARLES P. CHISHOLM.
JOHN A. CHISHOLM.

Witnesses:
THOS. KELL BRADFORD,
ROBERT C. SCOTT.